H. H. SUTRO & L. M. BOOTH.
WATER SOFTENING AND PURIFYING APPARATUS.
APPLICATION FILED JUNE 28, 1904.

910,327.

Patented Jan. 19, 1909
2 SHEETS—SHEET 1

H. H. SUTRO & L. M. BOOTH.
WATER SOFTENING AND PURIFYING APPARATUS.
APPLICATION FILED JUNE 28, 1904.

910,327.

Patented Jan. 19, 1909.
2 SHEETS—SHEET 2.

UNITED STATES PATENT OFFICE.

HARRY HERBERT SUTRO, OF NEW YORK, N. Y., AND LEVIS MILLER BOOTH, OF PLAINFIELD, NEW JERSEY.

WATER SOFTENING AND PURIFYING APPARATUS.

No. 910,327.    Specification of Letters Patent.    Patented Jan. 19, 1909.

Application filed June 28, 1904. Serial No. 214,441.

*To all whom it may concern:*

Be it known that we, HARRY HERBERT SUTRO, of the borough of Manhattan, in the city and State of New York, and LEVIS MILLER BOOTH, of Plainfield, in the county of Union and State of New Jersey, have invented a new and Improved Water Softening and Purifying Apparatus, of which the following is a specification.

The object of this invention is to provide a simple and effective apparatus for softening and purifying water and the particular features of our invention are described in the following specification and pointed out in the appended claim.

Figure 1:
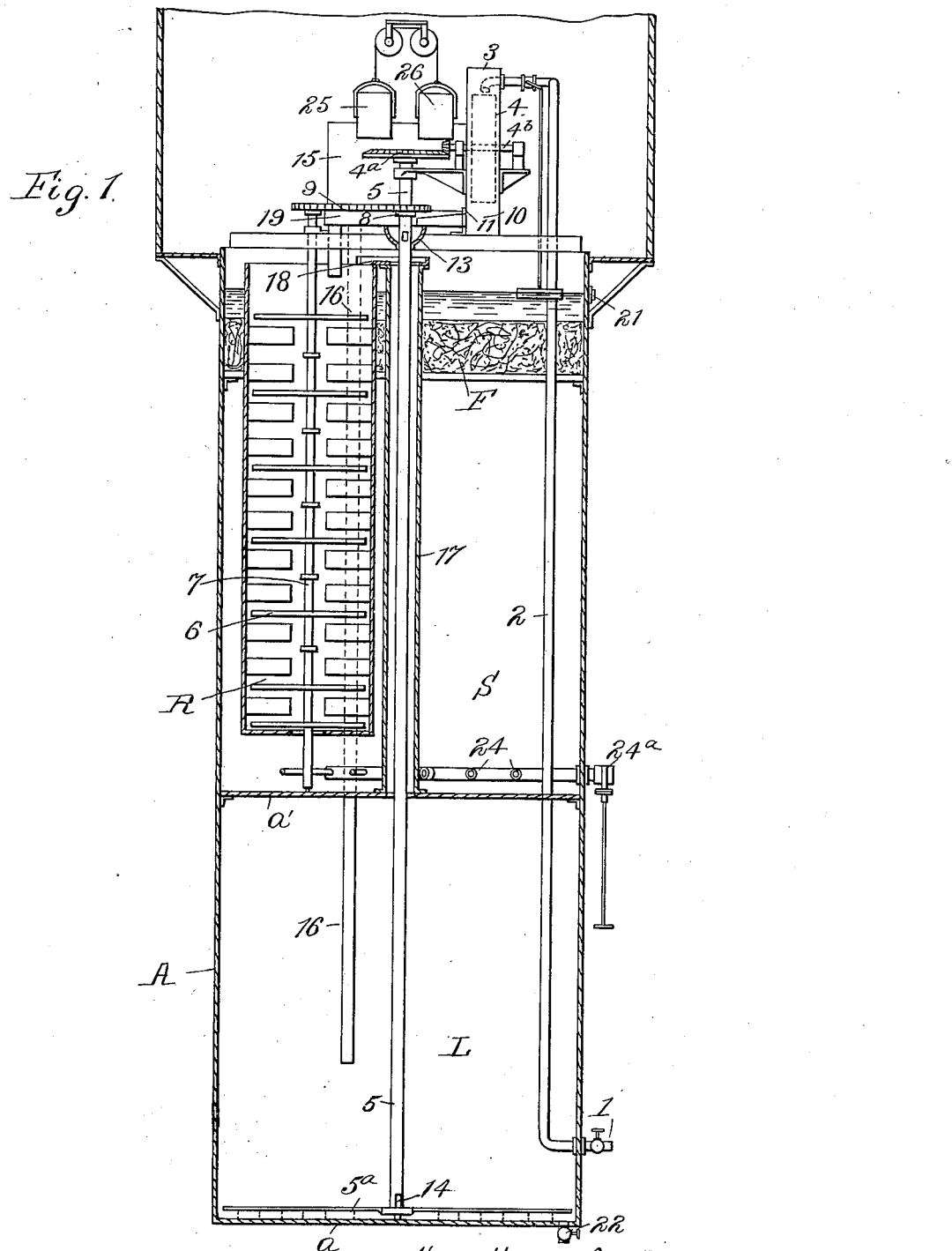
Figure 2:
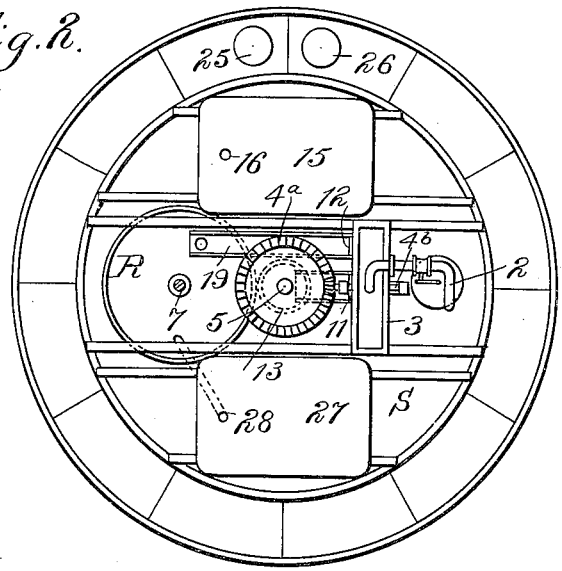
Figure 3:
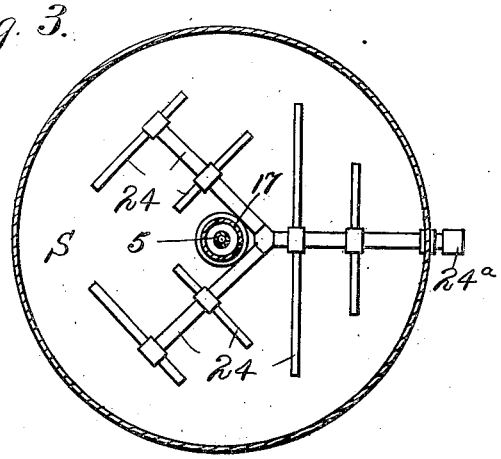

In the accompanying drawings, Figure 1 is a vertical section of an apparatus illustrating the invention. Fig. 2 is a diagrammatic plan view thereof. Fig. 3 is a horizontal section near the bottom of the settling tank or reservoir illustrating a suitable arrangement of dumping passages for discharging of precipitated matter 1 indicates the inlet for raw water and 2, a conducting pipe ascending therefrom, from which the water is delivered upon an overshot water wheel 4 within a box 3. The shaft $4^b$ of the water wheel is connected by bevel gearing $4^a$ with a hollow shaft 5 carrying at its lower end stirring arms $5^a$ at the bottom of the lime water tank L and having discharge openings 14.

15 indicates a vat in which lime is slaked and from which milk of lime flows by a pipe 16 to the bottom of the lime-water tank L.

Our apparatus is preferably constructed of a single shell of steel or other suitable material and this shell we have designated by the letter A. The shell is provided with a suitable bottom, $a$, and is horizontally divided by a partition $a^1$ into the lime-water-tank L, which we prefer to place at the bottom of the apparatus and an upper tank S which serves as a settling tank, and into which the treated water is discharged from the re-action tank R, which is also preferably cylindrical in form and is preferably contained within the tank S, but which may be placed in the lime tank L. By placing the re-action tank R within the settling tank S, the raw water and the chemicals to be mingled therewith may be introduced at the top of the re-action tank and passing down through the tank R and out through the open or unclosed lower end thereof be discharged into the settling tank with as little agitation as possible of the contents of the settling tank and without any conduit or piping to effect such discharge. In the reaction tank are agitating arms 6 carried by shaft 7 which is rotated from the shaft 5 by means of sprocket wheels 8 and chain 9.

11 and 12 indicate gates discharging water in two streams from the lower part 10 of the wheel box 3, one stream being conveyed by a chute 19 to the re-action tank R and the other being delivered to the bowl 13 for conveyance to the lime tank L.

17 indicates a conducting pipe from the top of the lime tank surrounding the pipe shaft 5, and 18 a spout leading from the top of the pipe 17 to the reaction tank R.

25 and 26 represent buckets for hoisting lime or other chemicals.

27 indicates a vat for soda ash or other chemical re-agent required for purification of the water 28 indicates a discharge opening from which the soda solution or other chemical is conducted to the upper part of the reaction tank R.

Precipitates are discharged from the limewater tank L by suitable dumps 22, which are distributed over the bottom of the tank L. To discharge the precipitates from the settling tank S, branch pipes 24 are provided; the openings into which are distributed over the bottom of the tank as illustrated in Fig. 3 and which lead to a suitable dumping cock $24^a$.

F indicates a filter in the upper part of the settling tank through which the water ascends, and 21 an outlet for purified water above said filter.

The particular location of the re-action tank R is manifestly immaterial.

Operation. The water enters the inlet at 1, flows upward to the wheel box 3 through the piping 2. The fall of the water is utilized to drive the water wheel 4. This actuates the main stirring shaft 5 by means of beveled gearing. Motion to drive the reaction tank stirrer 6, is communicated to the agitator shaft 7 by means of the sprocket wheel 8 and chain 9. After having passed from the water wheel 4, the water leaving the compartment 10 in the wheel box 3, is divided into two streams by the gates 11 and 12, respectively. The portion flowing from 11 passes into the bowl 13 and flows down the pipe shaft 5 to the bottom of the lime tank where it emerges at the outlet openings 14. Here the water meets the milk of lime which has been previously slaked in the lime vat 15. After being slaked the lime is dropped to the bottom of the lime-water tank through the pipe 16. After the water has dissolved a sufficiency of slaked lime it flows upward around the pipe shaft 5 in the sleeve 17 and overflows by the chute 18 into the re-action tank. Here it meets the rest of the water which flows from the gate 12 by way of the chute 19. Any soda ash or other re-agent necessary for the treatment of the water is also introduced at approximately the top of the re-action tank. The water with the re-agent solution flows downward in the re-action tank, being stirred continuously by the agitator bars 6, on the shaft 7. At the bottom of the re-action tank the water emerges and flows upward through the settling tank without agitation, depositing the precipitates on the way and the purified water flows through the filter to the outlet.

The particular advantages of this type of machine over a machine in which the tanks are placed side by side, are among others the following:

1. With a machine having the same tank capacity, and the same settling area in both the settling tank and the lime tank, it is possible to obtain a discharge of the purified water at a much greater elevation, which is a decided advantage in many instances.

2. With a machine of the same ground area, it is possible to obtain a far greater settling area for both the lime and settling tanks, as each of the tanks in the construction shown have a settling area which is equal to the ground area of the apparatus less only the space occupied by the re-action tank.

3. It is possible to construct the apparatus from a single cylinder dividing the same by a diaphragm partition into separate compartments which serve as a lime water tank and a settling tank, each having a bottom area or settling area equal to the ground area of the apparatus less the space occupied by the re-action tank and by this means of construction the least possible material is used in constructing the apparatus, the cost of construction is reduced to a minimum and the apparatus has the greatest possible strength for the amount of material used.

4. Due to the large bottom area of the lime and settling tanks the greatest possible efficiency is obtained as the efficiency of both the lime and settling tanks is determined almost entirely by the bottom area or settling area of these tanks.

5. By the use of the hollow shaft 5, an additional pipe or conduit for conveying raw water to the lime water tank is dispensed with and by constructing the pipe 17 which conducts lime water from the lime-water tank to the re-action tank in the form of a sleeve surrounding pipe 5 a stuffing box for the hollow shaft 5 in the diaphragm partition is dispensed with and the lime-water is conducted to the top of the apparatus and openly discharged into the top of the mixing tank, rendering it possible at any time to inspect or obtain a sample of the lime water as it is discharged into the mixing chamber.

Having thus described our invention, the following is what we claim as new therein and desire to secure by Letters Patent:—

In an apparatus for softening and purifying water, the combination with a hollow upright cylinder, divided horizontally by a partition into separate compartments, one of which serves as a settling tank and the other as a lime water tank, of a re-action tank contained in said cylinder, means for conducting water and lime into the lime-water tank, means for conducting lime water therefrom to the re-action tank, a chemical solution tank, means for conducting solution therefrom to the re-action tank, and means for conducting raw water to the re-action tank and means for conducting treated water from the re-action tank to the bottom of the settling tank and means for discharging purified water from the upper part of the settling chamber, substantially as described.

Signed at the city of New York, in the county and State of New York, this 12th day of May, 1904.

HARRY HERBERT SUTRO.
LEVIS MILLER BOOTH.

Witnesses:
   B. A. ITTNER,
   E. QUINN.